Aug. 3, 1971　　　A. W. COCHARDT　　　3,597,357
METHOD OF MAKING STRONTIUM-FERRITE MAGNETS AND
THE PRODUCTS SO PRODUCED
Filed March 19, 1968

WITNESSES

INVENTOR
Alexander W. Cochardt
BY
ATTORNEY

United States Patent Office

3,597,357
Patented Aug. 3, 1971

3,597,357
METHOD OF MAKING STRONTIUM-FERRITE MAGNETS AND THE PRODUCTS SO PRODUCED
Alexander W. Cochardt, Export, Pa., assignor to Westinghouse Electric Corporation, Pittsburgh, Pa.
Filed Mar. 19, 1968, Ser. No. 714,191
Int. Cl. C04b *32/26*
U.S. Cl. 252—62.63
24 Claims

ABSTRACT OF THE DISCLOSURE

A process is described for the production of strontium ferrite magnets employing hematite and celestite as the starting materials. Data is included on the magnetic characteristics and the hysteresis properties of the finished material.

BACKGROUND OF THE INVENTION

The present invention relates to a method for making strontium-ferrite magnets employing hematite and celestite as the starting materials from which the strontium-ferrite is ultimately manufactured. Barium ferrite has been known in the magnet industry for some years and has dominated the field of permanent magnet ferrite materials. In U.S. Pat. No. 3,113,927 issued Dec. 10, 1963 and in reissue Pat. No. 26,153 which issued Jan. 31, 1967 strontium-ferrite materials are described essentially as materials having properties superior to those exhibited by barium ferrite. Through these prior art processes strontium-ferrite magnetic material has now reached the commercial market and is sold in competition with barium ferrite.

In Reissue Pat. No. 26,153 there is described a method for making strontium-ferrite magnetic materials. This process includes the production of a sulfate containing strontium carbonate by first reducing the mineral celestite from a sulfate to a sulfide, dissolving the product of the reaction in water, and finally adding to the solution a quantity of sodium carbonate to precipitate the desired complex strontium carbonate-sulfate. The material thus produced contained approximately 89 to 93% by weight of strontium carbonate which was one of the raw materials to be reacted subsequently with ferric oxide for the production of strontium-ferrite magnets. The ferric oxides thus employed were usually of a purified form and required the separate step of preparing the ferric oxide as such. Since each of the reactants for producing the strontium-ferrite magnet was separately prepared and thereafter mixed and reacted to form the strontium-ferrite magnet, it is at once apparent that great expense is incurred in the separate preparation of the strontium carbonate involving many complicated processing steps.

In addition, another difficulty has been encountered in this process. Separately prepared strontium carbonate has a relatively large average particle size usually in excess of 50 microns. The large particle size necessitates relatively long milling times together with the ferric oxide and, where normal times are employed, the relatively large particle size results in a relatively unreactive material requiring very high temperatures for the reaction to strontium-ferrite. This difficulty becomes even more apparent when the ferric oxide particle size is also large. It is of course desirable to employ the cheapest raw materials providing the overall processing costs do not get out of hand. It has been discovered that it is highly desirable to employ hematite ore as the source of the ferric oxide. Not only is the hematite ore many times less expensive than the synthetic ferric oxides now employed in the production of strontium-ferrite magnets, but more so, hematite ore is denser than the synthetic ferric oxides. Consequently, the end product is usually more dense than the magnet produced employing synthetic ferric oxide and as a result thereof is less prone to cracking during the sintering operation.

As a practical matter another difficulty is also apparent during the separate production of strontium-carbonate employing the conventional ball mill process. In order to obtain the proper reaction between the mineral celestite and soda ash for the production of strontium-carbonate it has been found necessary that a water to solids ratio must be at least 2.5 whereas the normal water to solids ratio should be less than 1 for proper milling in a conventional ball mill. As a result thereof this separate preparation of strontium-carbonate has produced extensive damage to gears, bearings and lifter bars of the ball mills employed because of the low viscosity of the slurry. The present invention alleviates these difficulties during the reaction by the simultaneous milling of hematite ore, the mineral celestite and employing sufficient soda ash and water for the production of a reaction product eminently suitable for making strontium-ferrite magnets.

SUMMARY OF THE INVENTION

This invention is directed to a process for making a strontium-ferrite type magnetic material generally having the formula $SrO \cdot 6Fe_2O_3$. This material is produced by reacting in water the mineral celestite with a source of carbonate ions in the presence of hematite ore. The reaction of celestite with the carbonate ions results in the precipitation of a modified strontium-carbonate. The reaction preferably occurs as the solid constituents are milled to a relatively fine particle size. While the precise mechanism by which the strontium-carbonate is formed is not completely understood, it is believed that the strontium-sulfate of the mineral celestite reacts with the carbonate ion forming strontium carbonate which is precipitated upon the finely milled particles of the hematite ore. Thereafter, the milled solids are washed with water to remove the excess sulfate ion therefrom and the resulting solids are thereafter dried and calcined at a temperature in the range between about 900° C. and about 1400° C. to produce the desired strontium-ferrite permanent magnet material. Most unexpectedly, the magnetic properties of the strontium-ferrite magnets produced by the above described process are superior to the magnets produced by the more expensive and more complicated prior art processes. In addition thereto the mechanical properties and crack resistance of the magnets produced from the material of the present invention are superior to those of the prior art processes.

It is an object of this invention to provide a relatively simple and inexpensive process for producing strontium-ferrite magnet material from natural ores or other readily available raw materials.

Another object of this invention is to provide a process for producing strontium-ferrite type magnet materials which exhibit a high intrinsic coercive force together with excellent remanence in a permanent magnet material.

These and other objects of the present invention will become more clear when taken in conjunction with the following description and the drawings forming a part hereof.

DESCRIPTION OF THE PREFERRED EMBODIMENT

Figure 1:
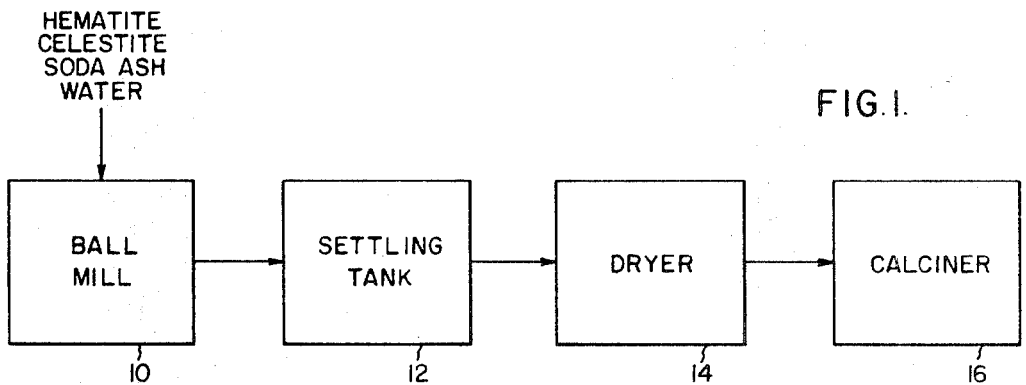
FIG. 1 is a simplified flow chart showing the various stages in the manufacture of strontium-ferrite permanent magnet material in accordance with the present invention.

Referring to the drawings and to FIG. 1 in particular there is shown a simplified flow chart by which strontium-ferrite magnetic material is produced in accordance with the process of the present invention. As illustrated in FIG. 1 there is provided a ball mill 10 into which predetermined amounts of hematite, celestite, a source of carbonate ions, preferably soda ash, and water are loaded.

Broadly speaking the present invention contemplates the use of about 80 to about 90 parts by weight of hematite, about 17 to about 21 parts by weight of celestite, about 14 to about 16 parts by weight soda ash and about 60 to about 80 parts by weight of water. Outstanding results have been achieved when the charge to the ball mill included about 85 parts by weight of hematite, about 19 parts by weight celestite, about 15 parts by weight soda ash and about 70 parts by weight of water.

These raw materials are placed in the ball mill 10 containing steel balls and thereafter the ball mill is actuated for a period of time varying between 2 and about 24 hours. In practice it has been found that the reaction is complete and the desired particle size is obtained usually after ball milling for a period of from 12 to 16 hours depending upon the condition of the starting materials. Following the completion of the ball milling the slurry is transferred into a settling tank designated 12 in the drawing of FIG. 1 where it is washed by dilution with additional water. During the settling the reacted particles gravitate to the bottom of the tank and the clear liquid is thereafter decanted. After the reacted particles have been thoroughly washed they are sent to a dryer designated 14 in FIG. 1 where practically all excess water is removed. Thereafter the dried particles are heated to a temperature of from 900° C. to 1400 C. and preferably at about 1200° C. in the calciner designated as 16 in FIG. 1.

More particularly, it has been found that the raw materials which are charged into the ball mill 10 are materials found to be naturally occurring. In this respect it is noted that Brazilian iron ore referred to as "Open Hearth Lump" is particularly suited as the source of hematite for the process of the present invention. Brazilian iron ore contains between 67.5 and about 69.0% iron, from about 0.20% to about .7% silicon, about 0.25% to 1.0% aluminum and the balance essentially oxygen with residual impurities. The source of strontium is preferably the naturally occurring mineral celestite. This mineral should contain at least 80 weight percent strontium sulfite and a typical analysis will include about 91.06% strontium sulfate, 3.42% barium sulfate, 5.73% calcium sulfate, about 0.2% silica and about 0.1% alumina.

These two naturally occurring raw materials are charged into the ball mill and any source of a carbonate ion may be employed for reacting with the strontium of the celestite to form strontium carbonate. In this respect it is noted that the most convenient source of the carbonate ion is found in soda ash. In addition thereto, sodium sulfate which is produced during the reaction where soda ash is employed is soluble in water and can be easily washed from the reaction products. Accordingly while any source of carbonate can be employed soda ash is the preferred. These materials are charged to the ball mill and water is added in the preferred ratio of about 100 parts by weight of water-insoluble solids to about 65 parts by weight of water. In addition to the foregoing aspect of limiting the ratio of the solids liquid for proper ball milling it has also been found that it is desirable to limit the ratio of the soda ash to celestite which is charged into the ball mill. It has been found that a weight ratio of about .5 of soda ash to celestite ore is the lower limit in order for the final product to exhibit good magnetic characteristics. On the other hand where the soda ash to celestite ratio exceeds about 0.8, no further significant improvement in magnetic characteristics have been determined although nothing detrimental has been observed in ratios of up to 1. Accordingly, it is preferred to maintain the ratio of soda ash to celestite within the range between about 0.5 and about 0.8, with the higher raios being preferred. By maintaining the soda ash to celestite ratio within the range between about 0.5 and about 0.8 and ball milling for a period of from about 2 to about 24 hours and preferably from about 12 to 16 hours it is found that substantially a 98% completion of the reaction to form strontium-carbonate has been accomplished. While it is not known what precise reaction occurs or by what mechanism it is accomplished, it is believed that an insoluble strontium-carbonate is formed which precipitates in a very fine form on the fine iron ore particles. With this amount of strontium-carbonate present the weight of hematite ore can be derived in order to provide for the stoichiometric composition of the strontium ferrite having the formula substantially SrO·Fe$_2$O$_3$.

EXAMPLE I

Into a conventional 26 gallon ball mill a total of 73½ pounds of crushed Brazilian open hearth lump ore was charged. This ore had a typical composition of 68.9% by weight iron, 30.0% by weight oxygen, 0.31% by weight silicon, 0.35% by weight of aluminum, and the balance incidental impurities. The hematite had a crushed particle size of ¼ inch and down. In addition to the hematite, 15¼ pounds of uncrushed 5 inch and down Mexican celestite having a typical analysis of 91.06% strontium sulfate, 3.42% barium sulfate, 5.73% calcium sulfate, .2% silica .1% alumina and the balance incidental impurities were added together with 11½ pounds of soda ash. Also, 1¾ pounds of lead oxide were charged into the mill together with 60 pounds of water and 500 pounds of steel balls. The entire charge was milled for a time period of 16 hours, during which it is believed the following chemical reaction took place

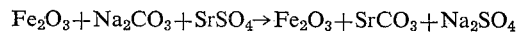

$$Fe_2O_3 + Na_2CO_3 + SrSO_4 \rightarrow Fe_2O_3 + SrCO_3 + Na_2SO_4$$

At the end of 16 hours ball milling it was determined that the reaction as set forth by the above identified equation was approximately 98% complete. After the completion of the ball milling the particles had an average size of from 5 to 10 microns. The slurry was emptied into a settling tank and water was added. The liquid above the sludge line was decanted after the settling of the slurry. The addition of the water was sufficient for removing the major portion of the sodium sulfate which was formed during the reaction. Thereafter the slurry was dried by evaporating the water and the dried cake was calcined for approximately 5 minutes at a temperature of 2200° F. in a rotary tube furnace. The clinkers which were obtained from such calcining were thereafter crushed and pulverized.

In order to demonstrate the outstanding magnetic characteristics of the strontium-ferrite material thus produced 1000 grams of the clinker powder and 1400 cc. of water containing 2% sodium naphthalene sulfate were milled for a period of 24 hours employing 27 pounds of steel balls in a Szegvari-Attritor. The resulting slurry was thereafter dewatered to form magnet bodies which were pressed in a magnetic field and fired. In order to produce the magnet designated as 5731, the material was formed into a body under the influence of a magnetic field and was fired at 2100° F. for a period of 2 hours. For magnet 5730 the material was fired at 2200° F. for a period of 2 hours and magnet 5734 was fired for 10 minutes at a temperature of 2300° F.

Figure 2:
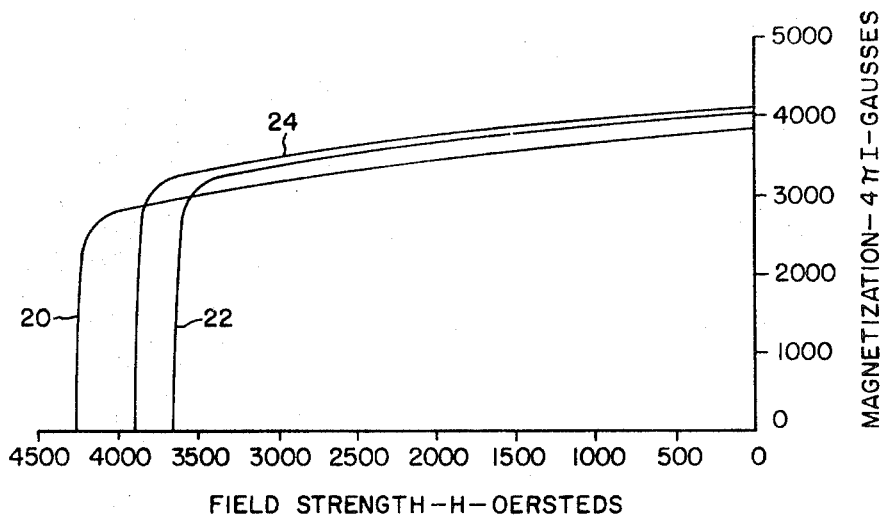
FIG. 2 is a graphical representation of a portion of the hysteresis loop of the magnets produced from the material produced in accordance with the method of the present invention.

Referring now to FIG. 2 of the drawings it is seen that excellent magnetic characteristics are exhibited by the strontium-ferrite magnets produced in accordance with the foregoing example. The magnet fired for 2 hours at 2100° F. is identified by the curve 20 in FIG. 2 and exhibited an intrinsic coercive force of 4295 oersted and remanence of 3810 gauss thus substantiating the outstanding magnetic characteristics exhibited by materials produced in accordance with the process of the present invention. While higher firing temperatures were effective for decreasing the intrinsic coercive force nonetheless the remanence was significantly increased as demonstrated by curve 20 of FIG. 2. Where even higher temperatures are used that is of the order of 2300° F. but for the shorter time period of 10 minutes it is seen from curve 24 of FIG. 2 that the intrinsic coercive force has been recovered without any significant loss in the remanence demonstrated by this material.

EXAMPLE II

Into a conventional 1000 gallon ball mill a total of 2830 pounds of hematite ore together with 650 pounds of Mexican celestite were charged together with 500 pounds of soda ash and 320 gallons of water. The hematite was a Brazilian ore 8 inch lump and finer which had been crushed to a size ½ inch and less. The hematite had a composition of 68.38% iron, 0.025% phosphorus, 0.35% silica, 0.04% manganese, 0.62% aluminum and the balance essentially oxygen and incidental impurities. The celestite had a typical analysis as set forth hereinbefore in Example I. Since the ratio of solids to water was approximately 100 parts by weight solids to 65 parts by weight of water considerable heat was generated during said ball milling and the mill was cooled with water so as to maintain a temperature not in excess of 110° F. The ball milling was continued for a period of 12 hours. Following the completion of the ball milling step the contents of the ball mill were pumped into a settling tank. Thereafter the material was washed with water several times in order to reduce as much as possible the total content of the sodium sulfate which had been formed during the reaction. After the fourth washing the material was thereafter dried and following drying the material was calcined at a temperature of 2225° F. in a rotary calciner. The dried cake was fed through at the rate of 1.65 to 2.00 pounds per minute to form the strontium-ferrite clinker.

Samples of the clinker were thereafter pulverized to a minus 40 mesh in a Braun dry disc pulverizer. Thereafter 300 grams of the minus 40 mesh powder was charged into a ball mill using 3/16 inch balls and milled for a total time of 18 hours. Thereafter magnets were pressed from an aqueous slurry of this powder in a mold which dewatered the slurry while subjected to a magnetic field to produce an anisotropic body and the body was fired for a period of two hours at each of two temperatures 2200° F. and 2250° F. with the following results. Magnets from this batch, identified as DHC26, had a remanence in excess of 3900 gauss, an intrinsic coercive force of about 4200 oersted and a squareness factor between .85 and .90, thus demonstrating the outstanding magnetic characteristics exhibited by these materials.

It is believed significant to point out that comparing the test results for the material processed by Example I and those of Example II one salient feature is outstanding. The magnets produced in Example II did not employ any additions of lead oxide. As is evident from the typical analysis of the raw materials employed no lead oxide was deliberately added, yet the magnetic characteristics demonstrated by the product of Example I and Example II were directly comparable. Consequently while it is contemplated that lead oxide may be present in the composition of the end product and while in some instances it may be desirable for conferring other characteristics, its presence is not necessary for obtaining outstanding magnetic properties.

In addition thereto it should also be pointed out that since a low water to solids ratio is contemplated in the process of the present invention considerable heat may be generated during said processing. As a result thereof, it is believed preferable to maintain such ball milling at a temperature not in excess of 70° C. This results from the fact that it is possible to convert some of the $Fe_2O_3$ to $Fe_3O_4$ and as a result thereof inferior magnetic characteristics will be produced in the final end product. Moreover, such pressures can be accumulated as to cause rupturing or even catastrophic failure.

As stated hereinbefore the ratio of the soda ash to celestite must be at least 0.5 and preferably values up to about 0.8 appear to result in improved magnetic properties. However where the ratio of soda ash to celestite is increased to beyond about 0.8 no further significant improvement in the properties exhibited by the ferrite magnets is demonstrated.

EXAMPLE III

A 26 gallon ball mill containing 400 pounds of half inch diameter and 100 pounds of two and one half inch diameter steel balls was charged and operated for 12 hours with the following ingredients: 70 pounds of water, 10 pounds of soda ash having 98 weight percent of sodium carbonate, 19½ pounds of uncrushed lump celestite 4 inches and down, and 85 pounds of crushed open hearth ore ½ inch and down. The soda ash to celestite ratio in this example is about 0.5. During this time the ingredients and the ball mill rose from room temperature to a temperature of 52° C. due to the mechanical agitation and the chemical reaction which took place within the mill. At the completion of the ball milling time the slurry was poured into a tank and was mixed with approximately 100 gallons of water. After settling, all liquid above the sludge line was decanted and the remaining slurry was dried by evaporating the water. The dried red cake was shoveled into the upper end of a rotating tube furnace and was heated for approximately 10 minutes at 1180° C. The pre-sintered clinkers were milled in a conventional ball mill in water for 10 hours. The slurry was then pressed in a filter press in a magnetic field of 6000 oersted and an end pressure of 6000 p.s.i. The pressed pieces were thereafter sintered in a conventional kiln in air for 2 hours at 1180° C. After cooling to room temperature the strontium ferrite magnets were tested as set forth hereinafter.

EXAMPLE IV

In a like manner as Example III, the same 26 gallon ball mill was charged and run under the same conditions except that 15 pounds of soda ash were used so as to provide a soda ash to celestite ratio of about 0.77. Under otherwise identical condition the magnets produced thereby were also tested for their magnetic properties, as set forth more fully hereinafter.

EXAMPLE V

The same process of Example III was repeated except that the soda ash addition at the start of the first ball milling operation was 19.5 pounds and thereby produced a soda ash to celestite ratio of about 1.

Reference is directed to Table I which lists the magnetic test results in terms of the ratio of soda ash to celestite for Examples III, IV and V.

TABLE I

| Soda ash/celestite ratio | $B_r$, gauss | $_iH_c$, oe. | $(BH)_{max.}$, MGoe. | $(B_rH_x)$ MGoe |
|---|---|---|---|---|
| 0.51 | 3,500 | 3,400 | 2.6 | 10 |
| 0.77 | 4,100 | 4,100 | 3.8 | 16 |
| 1.0 | 4,000 | 4,200 | 3.7 | 16 |

From the test results set forth in Table I it becomes apparent that increasing the soda ash to celestite ratio from a value of 0.51 up to about 0.77 produces an improvement in the basic magnetic characteristics demonstrated by these strontium-ferrite magnets. However when the soda ash to celestite ratio is increased to approximately equal quantities no further significant increase in the magnetic characteristics is observed.

From Table I it is noted that one heading includes the term $(B_rH_x)$. The quantity $H_x$ is defined as the H coordinate of a point on the demagnetization curve whose B coordinate is $0.8 B_r$. Thus the product $(B_rH_x)$ is inversely proportional to the volume of the magnet material required for obtaining a given torque in an electrical motor. The value 16 megagauss oersted is believed to be one of the highest ever reported for a ferrite material and only certain platinum-cobalt alloys exhibit similar properties.

As stated previously, part of the economies of the present process lie in the fact that an extremely pure source of ferric oxide is not necessary in practicing the process of the present invention. Thus the naturally existing hematite ore is an ideal starting material for the practicing of the process. However, hematite ores, in which the major component is $Fe_2O_3$, vary all over the world insofar as their iron content is concerned, that is, from an iron content as low as about 45% to values closely approximating the stoichiometric composition. While some of the naturally occurring ores will require benefication, a great many of the ores can be employed in the process of the present invention without benefication although it is prudent to consider the balance of the composition of the ore in order to prevent the introduction of large amounts of unwanted constituents. Preferably the hematite ore has a composition which includes between about 67.5 and about 69.0% iron, about 0.2% and about 0.7% silicon, about 0.25% and about 1.0% aluminum and the balance essentially oxygen, with incidental impurities. A typical analysis for a suitable Brazilian type open hearth lump is as follows: iron 68.38%, phosphorous 0.025%, silica 0.35%, manganese 0.04%, aluminum 0.62%, a trace of lime, a trace of MgO, sulfur 0.012%, moisture .74% and the balance essentially oxygen.

The mineral celestite is found in abundant quantities, among others, in the country of Mexico. Ideally the celestite should contain at least 80% by weight of strontium sulfate. A typical analysis however for celestite is as follows: $SrSO_4$ 92.5%, $CaSO_4$ 2.2%, $BaSO_4$ 1.5%, $CaCO_3$ 1.1%, $SiO_2$ 1.9%, $Al_2O_3$ 0.4%, and $H_2O$ 0.4%. The soda ash which has been utilized herein typically contains 98 weight percent $Na_2CO_3$.

By thus utilizing naturally occurring minerals and the process of the present invention, outstanding strontium ferrite magnets have been produced. The great savings which have been afforded by utilizing naturally occurring minerals effects great economy without any sacrifice in the magnetic properties exhibited by these compositions.

The sintered strontium-ferrite after being pulverized to a finely divided state having an average particle size of 10 microns and less, can be admixed with a natural or synthetic rubber or resins for example thermosetting resinous compositions such as phenolics, polyurethanes and epoxides, or thermoplastic resinous compositions such as polyvinyl-chloride, polyvinyl acetals and polystyrene, and the resin-ferrite mixture can be doped or molded into strips, plates, bars or other members, in a magnetic field if desired to orient the ferrite powders for example, after which the resin hardens or solidifies to a thermoset condition or rubber cured or cooled to render the thermoplastic resin solid. Magnetic bodies so produced have many useful applications.

The finely divided strontium-ferrite sinter product of this invention can be molded by any known process, dry or wet, to produce green isotropic magnetic bodies or molded in a magnetic field to produce green anisotropic magnet bodies, either of which are then fired to produce hard magnets of any suitable shape. The finally sintered magnets can be ground, drilled or machined to precise dimensions. Outstanding magnetic properties are exhibited by the magnets.

It will be understood that the above description and drawing are only exemplary.

I claim:

1. In the method of manufacturing permanent magnets of the strontium-ferrite type, the steps comprising reacting in water while ball milling, hematite, the mineral celestite, and soda ash, the weight ratio of the soda ash to celestite being within the range between about 0.5 and 1.0, removing substantially the greater portion of the water soluble sulfate ions formed as a part of the reaction product, drying the balance of the reaction product, and thereafter calcining the dried reaction product.

2. The process of claim 1 in which the celestite is present within the range between 15% by weight and 20% by weight of the reactants.

3. The process of claim 1 in which the reaction product exhibits an average particle size of 5 to 10 microns.

4. The process of claim 1 in which the ball milling temperature does not exceed 70° C.

5. The process of claim 1 in which the hematite has a composition including from about 67.5% to about 69.0% iron, from about 0.2% to about 0.7% silicon, from about 0.25% to about 1.0% aluminum and the balance essentially oxygen with incidental impurities.

6. The process of claim 1 in which the mineral celestite contains at least 80% by weight of strontium sulfate.

7. The process of claim 1 in which up to 2% PbO is added to the ball mill with the initial ingredients.

8. The method of claim 1 in which the calcined reaction product is thereafter pulverized, pressed while under the influence of a magnetic field, sintered, and thereafter magnetized.

9. In the method of manufacturing permanent magnets of the strontium-ferrite type, the steps comprising, reacting in water ferric oxide, carbonate ions and the mineral celestite containing at least 80% strontium sulfate, removing the major portion of the water soluble sulfate ions remaining after the reaction, drying the reaction product after the removal of the sulfate ions and thereafter calcining the reaction product.

10. A calcined strontium-ferrite product having a magnetoplumbite structure produced in accordance with the process of claim 9 and which when formed into a permanent magnet and is magnetized will exhibit an intrinsic coercive force of at least 3400 oersted and a product $(B_rH_x)$ of at least 10 megagauss oersted.

11. The process of claim 9 in which the ferric oxide is in the form of hematite ore.

12. The process of claim 9 in which the source of carbonate ions is soda ash.

13. The process of claim 9 in which the ratio of the weight percent of the source of carbonate ions to the weight percent of the celestite is within the range between .5 and about 1.0.

14. The process of claim 9 in which the reaction between celestite and the carbonate ions takes place during ball milling to form a strontium carbonate precipitate.

15. The process of claim 14 in which the reaction product exhibits an average particle size of 5 to 10 microns.

16. The process of claim 14 in which the ball milling takes place for a time period of between 2 hours and 24 hours.

17. The process of claim 14 in which the ball milling temperature does not exceed about 70° C.

18. The process of claim 11 in which the hematite ore has a composition including between about 67.5% and about 69.0% iron, about 0.2% and about 0.7% silicon, about 0.25% and about 1.0% aluminum and the balance essentially oxygen with incidental impurities.

19. In the method of manufacturing permanent magnets of the strontium-ferrite type the steps comprising combining between about 80 to about 90 parts by weight of hematite, about 17 to about 21 parts by weight of celestite, about 14 to about 16 parts by weight of soda ash and about 60 to about 80 parts by weight of water, reacting said combined ingredients while milling to reduce the average particle size to less than about 10 microns, removing at least the major portion of the water soluble ions remaining after the reaction, drying the reaction product and thereafter calcining the reaction product.

20. The method of claim 19 in which the hematite is present in an amount of about 85 parts by weight, the celestite is present in an amount of about 19 parts by weight, the soda ash is present in an amount of about 15 parts by weight and the water is present in an amount of about 70 parts by weight.

21. The method of claim 19 in which the ratio of soda ash to celestite is within the range between about 0.5 and 0.8.

22. The method of claim 19 in which the reaction takes place during ball milling.

23. The method of claim 22 in which the reaction takes place during ball milling for a time period of between 12 hours and 16 hours.

24. The method of claim 22 in which the ball mill temperature does not exceed about 70° C.

References Cited

UNITED STATES PATENTS

| | | | |
|---|---|---|---|
| 3,113,927 | 12/1963 | Cochardt | 252—62.63 |
| 3,155,623 | 11/1964 | Erickson et al. | 252—62.63 |

FOREIGN PATENTS

| | | | |
|---|---|---|---|
| 1,496,844 | 8/1967 | France | 252—62.63 |

ROBERT D. EDMONDS, Primary Examiner